US006695176B1

(12) United States Patent
Nazari

(10) Patent No.: US 6,695,176 B1
(45) Date of Patent: Feb. 24, 2004

(54) PUMP DISPENSER HAVING AN IMPROVED DISCHARGE VALVE

(75) Inventor: Joseph Nazari, La Crescenta, CA (US)

(73) Assignee: Saint-Gobain Calmar Inc., City of Industry, CA (US)

( * ) Notice: Subject to any disclaimer, the term of this patent is extended or adjusted under 35 U.S.C. 154(b) by 0 days.

(21) Appl. No.: 10/214,160

(22) Filed: Aug. 8, 2002

(51) Int. Cl.[7] .................................................. G01F 11/02
(52) U.S. Cl. ..................................................... 222/321.9
(58) Field of Search .............................. 222/320, 321.1, 222/321.3, 321.7, 321.9, 382; 137/843, 852, 854

(56) References Cited

U.S. PATENT DOCUMENTS 2,912,999 A 11/1959 Kersh ....................... 137/512.4
3,229,864 A * 1/1966 Roder ...................... 222/321.7
3,502,035 A * 3/1970 Fedit et al. ................. 417/480
4,286,736 A 9/1981 Corsette ..................... 222/321
4,991,747 A * 2/1991 Van Brocklin ........... 222/321.3
5,326,238 A * 7/1994 Schukey ..................... 417/511
5,476,197 A * 12/1995 Lawrence et al. ....... 222/321.7
5,931,352 A 8/1999 Dirr ........................... 222/212

* cited by examiner

*Primary Examiner*—Gene Mancene
*Assistant Examiner*—Patrick Buechner
(74) *Attorney, Agent, or Firm*—Dykema Gossett PLLC

(57) ABSTRACT

A manual pump dispenser which includes a reciprocable pump piston has a discharge valve snap-fitted to the pump body for the outletting of the liquid product from the pump chamber, the discharge valve being formed of an elastomer material and comprising a conically-shaped valve element at one end sloping outwardly toward the discharge passage, the valve having a non-reentrant element at its opposite end for snap fit engagement with a transverse support web within the pump body through a coaxial opening thereof, the conically-shaped valve element seating against a circular valve seat having a complementary taper to that of the valve element.

5 Claims, 1 Drawing Sheet

PUMP DISPENSER HAVING AN IMPROVED DISCHARGE VALVE

BACKGROUND OF THE INVENTION

This invention relates generally to a manually actuated pump dispenser having an improved discharge valve member, and more particularly to such a valve member of elastomeric material having a generally conical valve element and a non-reentrant element permitting the discharge valve to be snapped in place on assembly.

The known manually actuator pump dispensers especially those designed for the dispensing of hand lotions, body lotions, liquid soaps, and other more highly viscous products, typically have both inlet and outlet ball check valves for respectively controlling the flow of liquid product into the pump chamber on each piston suction stroke and for controlling the out flow of the liquid product from the pump chamber during each piston compression stroke. The discharge passage immediately downstream of the discharge valve traverses into a discharge extending through an elongated discharge spout. U.S. Pat. No. 4,286,736 is exemplary of such a known pump dispenser.

The difficulty with the discharge valve in the form of a ball check valve is that the creamy product being dispensed oftentimes impedes the full and proper reclosing of the ball check valve against its valve seat on each piston suction stroke following ensuing piston pressure strokes. This is especially a drawback when dispensing more highly viscous liquid products, such as a commercial cleaning gel containing pumice as a scrubbing agent. The passage downstream of the discharge valve retains product being dispensed during the closing of the discharge such that while the ball check valve is out of sealing engagement with its valve seat during the discharge open condition, the viscous liquid product in the vicinity of the valve may interfere with the reclosing of the valve against its seat in a sufficiently quick manner and in a tightly sealed manner for closing the discharge during the piston suction stroke. This could interfere with the smooth and accurate operation expected for the pump.

There is thus the need to improve upon the discharge valving for manual pump dispensers of the aforedescribed type, such that the discharge valve quickly and accurately and sealingly responds to each piston suction stroke by sealing tightly against its valve seat without delay. Such a valve must also be capable of easy and uncomplicated sub-assembly with other parts of the pump while at the same time be economical to mass produce yet highly reliable.

SUMMARY OF THE INVENTION

It is therefore an object of the present invention to provide an improved discharge valve member for a manual pump dispenser which will quickly respond for sealing the discharge flow path during each piston suction stroke irrespective of the viscosity of the product being dispensed, while at the same time is economical to mass produce and yet highly reliable and efficient in operation and easy to assemble. The improved discharge valve member according to the invention is an elastomeric valve having a conically shaped valve element and a non-reentrant portion permitting the valve to be snap-fitted into place within the pump body. The conical valve slopes outwardly in a downstream direction and its outer conical surface engages a conical valve seat defined within the pump body presenting a tight seal in the discharge closed position.

The non-reentrant portion of the valve snap fits within an opening of a transverse web within the pump body, such wall being spaced axially from the valve seat a predetermined distance so as to effect the tight sea of the conical valve element against its seat.

Other objects, advantages, and novel features of the invention will become more apparent from the following detailed description of the invention when taken in conjunction with the accompanying drawings.

BRIEF DESCRIPTION OF THE DRAWINGS

FIG. 2 a view similar to FIG. 1 showing the discharge valve member according to the invention at an enlarged scale;

DETAILED DESCRIPTION OF THE INVENTION

Figure 1:
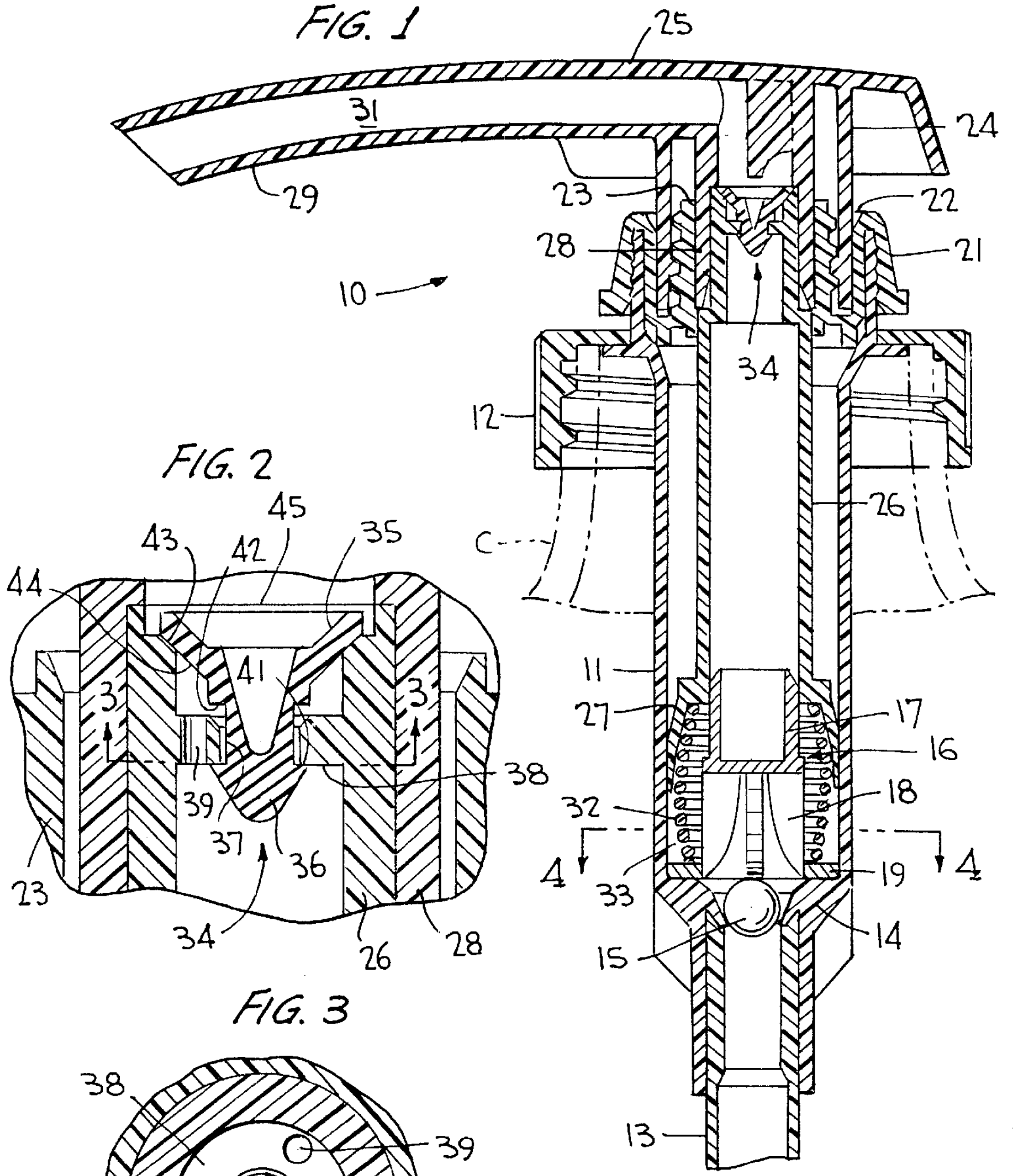
FIG. 1 is a vertical sectional view of a manually actuated pump sprayer incorporating the improved discharge valve member according to the invention.
Figure 4:
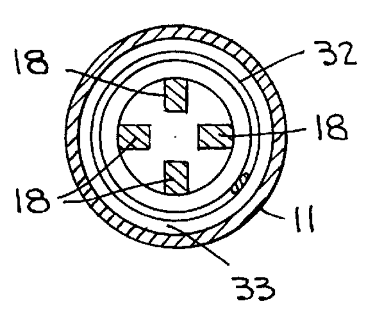
FIG. 4 is a sectional view taken substantially along the line 4—4 of FIG. 1.

Turning now to the drawings wherein like reference characters refer to like and corresponding parts throughout the several views, a manually operated pump dispenser of a type which incorporates the discharge valve member according to the invention is generally designated 10 in FIG. 1 and comprises a pump body which includes a pump cylinder 11 adapted to be affixed to a container C of product to be dispensed by means of a closure cap 12 which may be internally threaded as shown or which may be adapted for snap fit engagement with the container neck in any normal manner. The cylinder suspends a dip tube 13 at its lower end which extends into the liquid in the container, a throat portion 14 near the lower end of the container supporting an inlet ball check valve 15 in a known manner. A dispenser seal 16 within the pump cylinder has an upstanding cylinder 17 with a plurality of depending legs 18 (which may be four in number as shown in FIG. 4), the legs terminating in transverse flanges 19. The central area defined between the four legs functions as a ball cage for the inlet ball check valve.

A chaplet 21 is affixed to an upper end of cylinder 11 for both retaining the closure cap in place on the cylinder and for defining an annular opening 22 with lock threads on an outer wall of cylinder 23 of the chaplet for mating with lock threads on a depending sleeve 24 on plunger head 25. The plunger head is affixed to an upper end of a hollow piston stem 26 of a piston having at its lower end an annular piston seal 27 in sliding sealing engagement with the inner wall of cylinder 11. The plunger head has an inner depending sleeve 28 which frictionally engages the upper end of the piston stem to effect a tight seal, and an elongated transverse spout 29 defining a discharge passage 31 which directly communicates with the upper end of the piston stem.

A piston return spring 32 within the pump cylinder bears at one end against flanges 19 of seal 16 and at its other end at the underside of the piston so as to bias the pump piston into its upper position outwardly of the pump cylinder as generally known in this art. The piston is shown in FIG. 1 in its downward locked position with the locking ribs on sleeves 23, 24 interengaged in a plunger lock down position such that the lower end of the piston stem frictionally engages cylinder 17 of seal 16 to seal the dispenser against leakage through the inlet valve in the event the dispenser is dropped, laid on its side, or during shipping and storage. Otherwise, in an unlocked position of the piston (not shown), the piston extends outwardly of its pump cylinder and is reciprocated within its cylinder upon application of manual pressure to the plunger head in the normal manner such that the piston defines with its cylinder a variable volume pump chamber 33.

Figure 3:
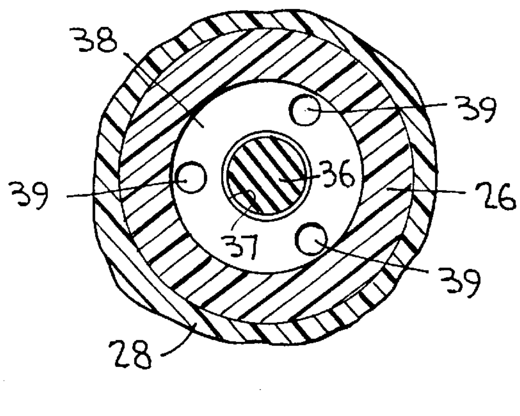
FIG. 3 is a sectional view taken substantially along the line 3—3 of FIG. 2.

The discharge valve according to the invention comprises a unitary discharge valve member 34 of resilient material such as a silicone or thermoplastic elastomer of various durometers. The valve member comprises a conically-shaped valve element 35 at one end, the valve element sloping outwardly away from the pump chamber and toward discharge passage 31 as clearly shown in FIGS. 1 and 2 of the drawings. The valve member further has a non-reentrant element 36 at its opposite end. Element 36 preferably terminates in a conical shape to facilitate insertion through an opening 37 formed coaxially in a transverse valve support web 38 which is integral with piston stem 26. One or more discharge ports 39 are provided in web 38 (FIG. 3) through which liquid product flows during the piston pressure strokes as will be more fully described hereinafter.

Non-reentrant element 36 is in the form of a stem having a constricted section defining spaced shoulders 41 and 42. As clearly shown in FIG. 2, the spacing between the shoulders slightly exceeds the thickness of web 38 for reasons to be described hereinafter.

The pump body has a discharge valve seat with which the discharge valve member sealingly engages to control liquid discharge from the dispenser during pump operation. More particularly, the valve seat is formed near the distal end of piston stem 26 and comprises an annular tapered surface 43 which is designed to match the slope of the conical valve element 35. The axial spacing between web 38 and valve seat 43 is such that upon installation of the discharge valve outer conical surface 44 of valve element 43 bears tightly and sealingly against complementary valve seat surface 43 as shoulder 41 snaps behind the inner face of web 38. Assembly of the discharge valve may be made conveniently and without obstruction as a sub-assembled part together with the pump piston prior to assembly of the plunger head to the pump body. In order to minimize impact and possible damage of the valve member with other sub-assembled parts at the assembly plant, the valve seat 43 is recessed and spaced inwardly from free end 45 of piston stem 26, as clearly shown in FIG. 2.

In operation, the plunger head is simply unthreaded from its lock-down position relative to chaplet 21 whereupon the piston return spring biases the piston and connected plunger head outwardly of the pump cylinder. After the pump is primed, product is drawn into pump chamber 33 through the valve inlet during each piston return stroke. And, the liquid product is discharged during each downward, pressure stroke of the piston as manual force is applied in a downward axial direction against the top of the plunger head as in any normal manner. During each piston pressure stroke, product from the pump chamber is forced through discharge ports 39 and against surface 44 of the discharge valve causing at least a portion of the conical valve element to deform to thereby break the seal between surface 44 and valve seat 43 so as to open the discharge valve allowing flow of product into discharge passage 31 and out through the discharge spout. The discharge valve remains open for so long as pressure upstream of the valve exceeds pressure downstream thereof. Thus, as soon as pressure on the opposite sides of the valve is equalized or the upstream pressure is reduced relative to the downstream pressure, the conical valve element of the discharge valve immediately responds to fully reseat on its valve seat into tight sealing engagement therewith to reclose the discharge passage. This pressure differential changes as manual external force applied against the plunger head is relaxed permitting the plunger and its connected pump piston to return under the force of the return spring to its upward position outwardly of the cylinder.

It can be seen that the discharge valve according to the invention is of simple and economical construction, yet is highly effective in controlling the discharge of especially viscous liquid products from the dispenser in a highly efficient and practical manner. The improved discharge valve is adaptable for use with existing dispensers and requires only a modified alteration in the upper end of the pump piston to accommodate the valve. The valve seat is shown and described as located near the distal end of the piston stem which is a convenient location for the valve seat, although the valve seat could be located in the pump body at locations upstream or downstream from that shown without departing from the invention, so long as the valve support web 38 is spaced from that valve seat to provide a tight liquid seal when the discharge valve is assembled in place as surface 44 of the valve element bears against the complementary shaped valve seat. It is important that the outer surface of the valve element bear against a discrete valve seat such as a seat having a complementary taper to that of the conicity of the valve element. In such manner, the snap fit engagement between the valve non-reentrant portion and support web 38 with the appropriate distance of the support web from the valve seat assures tight sealing engagement between conical surface 44 and the conical valve seat 43 in the discharge valve closed position. Valve element 35 is moderately flexible but sufficiently rigid to withstand the discharge valve being snap-fitted in place without distortion. One of the advantages of the invention is that the discharge valve is tightly sealed against its seat when installed irrespective of small tolerance changes due to molding imperfections and the like. Although the angularity of the conical valve element 35 is approximately at 45° relatively to the central axis thereof, the angularity can be between 5° and 60° without departing from the invention so long as the taper of the valve seat 43 is complementary and the valve is seated only at the outer conical surface of valve element 35 against the valve seat. And, the gap presented by the difference in spacing between shoulders 41, 42 and the thickness of web 38 assures intimate sealing contact between surface 44 and valve seat 43 upon installation and allows any tolerance changes during the manufacturing process. Also, in use, the gap permits the discharge valve to shift upstream when the pressure differential on the downstream side is greater. This likewise enhances the tight sealing engagement of the valve in the closed position.

Obviously, many modifications and variations of the present invention are made possible in the light of the above teachings. It is therefore to be understood that within the scope of the appended claims the invention may be practiced otherwise than as specifically described.

What is claimed is:

1. A manual pump dispenser, comprising, a pump body having a pump piston reciprocable between pressure and return strokes in a pump cylinder against the bias of a piston return spring to define with said cylinder a variable volume pump chamber, said pump body having an inlet valve for the inletting of a liquid product to said chamber upon the piston return strokes, a discharge valve snap-fitted to the pump body for the outletting of the liquid product from the chamber upon the piston pressure strokes through a discharge passage of a plunger head mounted to the piston, the discharge valve being formed of an elastomer material and comprising a conically-shaped valve element at one end sloping outwardly toward the discharge passage, the discharge valve having a non-reentrant element at an opposite end thereof, a transverse perforate support web within the pump body, the piston including a hollow cylindrical stem having at a terminal edge thereof an inner annular beveled wall defining an annular valve seat with which an outer conical surface of the valve element engages in a discharge valve closing position, the support web having an opening through which the non-reentrant element extends for snap-fit engagement as the outer conical surface engages the valve seat, and a portion of the outer conical surface disengaging the valve seat to open flow of the liquid product from the chamber through a discharge port in the support and through the discharge passage in a discharge valve open position.

2. The pump dispenser according to claim 1, wherein the valve seat and the support web are axially spaced apart a predetermined distance to assure a tight seal between the outer conical surface of the valve element and the valve seat in the discharge valve closed position.

3. The pump dispenser according to claim 1, wherein the non-reentrant element of the discharge valve includes a stem having a constricted portion defining at least one shoulder in engagement with an inner face of the web.

4. The pump dispenser according to claim 1, wherein the hollow cylindrical stem has a piston seal at an end thereof facing the inlet valve, piston seal being in engagement with an inner wall of the cylinder to therewith define the pump chamber.

5. The pump dispenser according to claim 1, wherein the opening in the support web is concentric to the stem.

* * * * *